(12) United States Patent
Farrugia et al.

(10) Patent No.: US 9,458,305 B2
(45) Date of Patent: Oct. 4, 2016

(54) METAL NANOPARTICLE-SULFONATED POLYESTER COMPOSITES AND GREEN METHODS OF MAKING THE SAME

(71) Applicant: XEROX CORPORATION, Norwalk, CT (US)

(72) Inventors: Valerie M. Farrugia, Oakville (CA); Alana Desouza, London (CA); Sandra J. Gardner, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/531,862

(22) Filed: Nov. 3, 2014

(65) Prior Publication Data
US 2016/0122499 A1    May 5, 2016

(51) Int. Cl.
*C08K 3/08* (2006.01)

(52) U.S. Cl.
CPC ......... *C08K 3/08* (2013.01); *C08K 2003/0806* (2013.01)

(58) Field of Classification Search
None
See application file for complete search history.

(56) References Cited

U.S. PATENT DOCUMENTS

| | | | | |
|---|---|---|---|---|
| 2009/0246358 | A1* | 10/2009 | Winkel | B41M 5/0023 427/98.5 |
| 2012/0202148 | A1* | 8/2012 | Veregin | G03G 9/093 430/108.1 |

FOREIGN PATENT DOCUMENTS

CN       101812181    *  8/2010

OTHER PUBLICATIONS

Full translation of Xinzhen et al. (CN 101812181), Aug. 25, 2010, p. 1-26.*
NPL, Synthesis of PS/Ag Nanocomposite Spheres with Catalytic and Antimicrobacterial Activities, Deng et al., p. 5625-5632.*
Lopez-Tobar, Eduardo, Stability of the Disulfide Bond in Cystine Adsorbed on Silver and Gold Nanoparticles as Evidenced by SERS Data, J. Phys. Chem. C2013, 117, 1531-1537.
Sironmani, A. et al. (2011) Silver Nanoparticles-Universal Multifunctional Nanoparticles for Bio Sensing, Imaging for Diagnostic and Targeted Drug Delivery for Therapeutic Applications, Drug Delivery and Development—Present and Future, Dr. Izet Kapetanovic (Ed.), ISBN: 978-953-307-615-7, In Tech, http://www.intechopen.com/books/drug-discovery-and-development-present-and-future/silver-nanoparticles-universal-multifunctional-nanoparticles-for-bio-sensing-imaging-for-diagnostics.
Kneipp, K. et al. Surface-enhanced Raman scattering and biophysics, J. Phys.: Condens. Matter 14 (2002) R597-R624.
Lee, K et al., In Vivo Imaging of Transport and Biocompatibility of Single Silver Nanoparticles in Early Development of Zebrafish Embryos (Sep. 2007) ACS Nano, vol. 1, No. 2, 133-143.
Korbekandi, H. et al., (2012) Silver Nanoparticles, The Delivery of Nanoparticles, Dr. Abbass A. Hashim (Ed.), ISBN: 978-953-51-0615-9, InTech, http://www.intechopen.com/books/the-delivery-of-nanoparticles/silver-nanoparticles.
Rashid, M. et al. Synthesis of Silver Nano Particles (Ag-NPs) and their uses for Quantitative Analysis of Vitamin C Tablets, Dhaka Univ. J. Pharm. Sci. 12(1): 29-33, Jun. 2013.
Rivera, P. et al., Synthesis and characterization of silver nanoparticles for biosensor design, Universidad Interamericana de Puerto Rico—Recinto de Ponce, Revista 360° /No. 8/2013.

* cited by examiner

*Primary Examiner* — Susannah Chung
*Assistant Examiner* — Robert T Butcher
(74) *Attorney, Agent, or Firm* — Pillsbury Winthrop Shaw Pittman LLP

(57) ABSTRACT

A method includes heating a sulfonated polyester resin in an organic-free solvent adding an aqueous solution of silver (I) ion to the heated resin to form a mixture and heating the mixture to effect the reduction of silver (I) ion to silver (0) in the absence of an external reducing agent. A composite includes a sulfonated polyester matrix and a plurality of silver nanoparticles dispersed within the matrix; the composite lacks trace residual byproducts from external reducing agents.

14 Claims, 12 Drawing Sheets

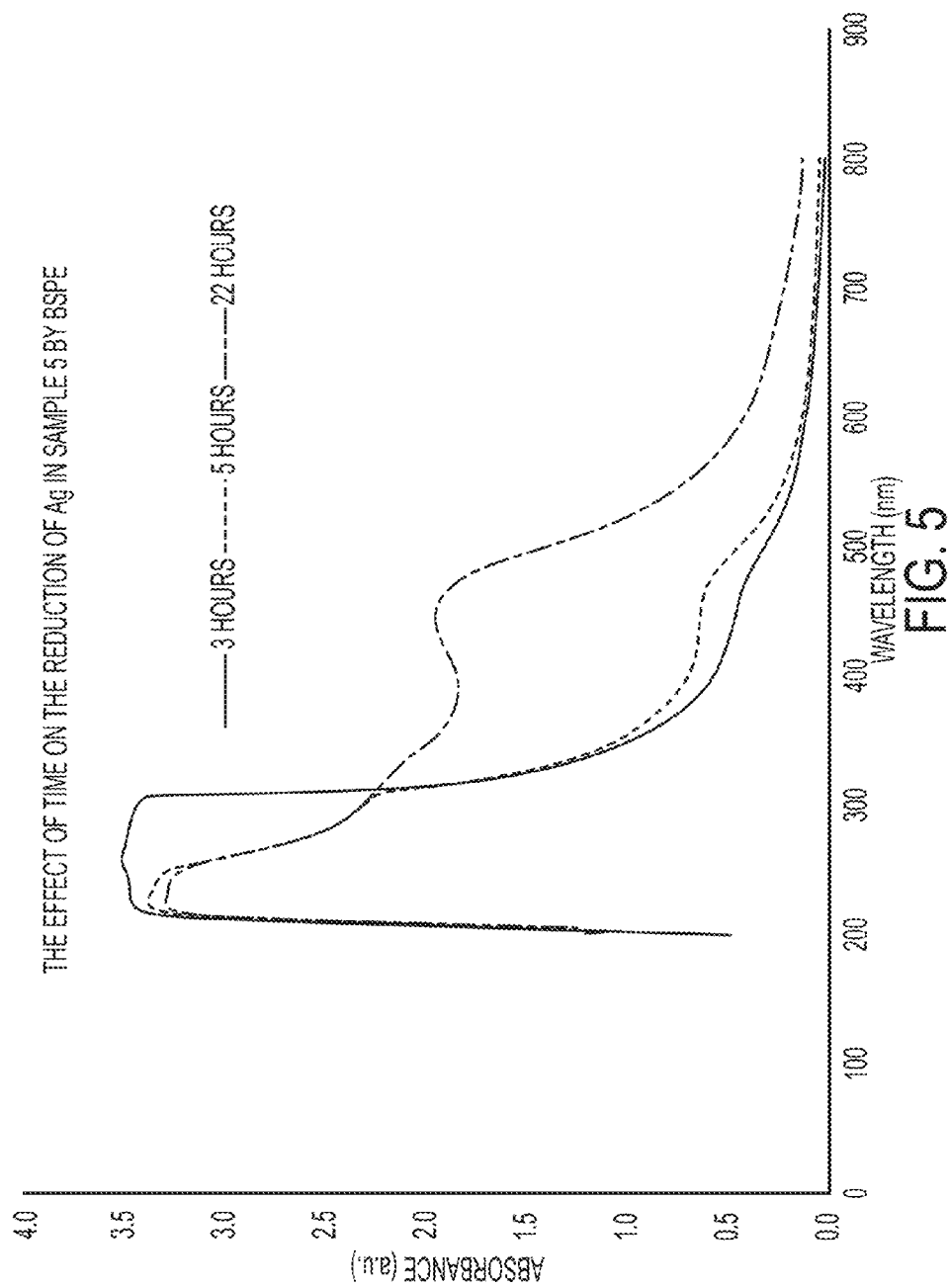

METAL NANOPARTICLE-SULFONATED POLYESTER COMPOSITES AND GREEN METHODS OF MAKING THE SAME

BACKGROUND

The present disclosure relates to composites. In particular, the present disclosure relates to composites comprising metal nanoparticles dispersed throughout the composite matrix.

There is an increasing interest in mixed inorganic/organic composite systems due to the property benefits each of the individual constituents confers on the composite material. One particular area of interest is silver nanoparticle (AgNP)-laden polymer composites. Such composites may be useful in antimicrobial and antibacterial applications, biosensor materials, composite fibers, cryogenic superconducting materials, cosmetic products, and electronic components. The unique properties of AgNPs, including size and shape-dependent optical, electrical, and magnetic properties, as well as antimicrobial and antibacterial properties, has resulted in increasing usage in consumer and medical products.

Many methods for the manufacture of metal/polymer nanostructured materials require pre-fabrication of metal nanoparticles by reduction of a metal salt precursor prior to incorporation into polymer matrices. For example, conventional methods for making silver/polymer nanostructured materials, in particular, generally require melt mixing or extrusion of silver nanoparticles (AgNPs) in polymer matrices. Unfortunately, these methods often suffer from silver nanoparticle aggregation.

SUMMARY

In some aspects, embodiments herein relate to methods comprising heating a sulfonated polyester resin in an organic-free solvent adding an aqueous solution of silver (I) ion to the heated resin to form a mixture and heating the mixture to effect the reduction of silver (I) ion to silver (0) in the absence of an external reducing agent.

In some aspects, embodiments herein relate to composites comprising a sulfonated polyester matrix and a plurality of silver nanoparticles dispersed within the matrix, wherein the composite lacks trace residual byproducts from external reducing agents.

BRIEF DESCRIPTION OF DRAWINGS

Various embodiments of the present disclosure will be described herein below with reference to the figures wherein:

FIG. 5 shows overlaid UV-Vis absorption spectra the reduction of silver (I) ion over time in a vial containing the most BSPE (Sample 5);

DETAILED DESCRIPTION

Embodiments here provide methods to reduce silver ion during the self-assembly of sulfonated polyesters (SPEs) in water without the need for an external reducing agent. The methods facilitate the formation of silver nanoparticle-laden composite structures with sulfonated polyester matrices. Methods herein are environmentally friendly because (1) they are conducted in organic-free solvents, i.e. water and (2) they eliminate the need for external reducing agents, such as sodium borohydride, sodium thiosulfate and other conventional reducing agents that require proper waste disposal. The sulfonated polyester requires minimal time to self-assemble in water in the presence of silver (I) ion and does not require solvents beyond hot water.

Methods disclosed herein exhibit an ability to control the rate of silver (I) reduction and improve emulsion stability when higher amounts of silver are needed in a polymer matrix. As disclosed herein, the rate of silver (I) reduction can be controlled by polymer loading and/or changing the heating/temperature profile of the reaction. Methods herein are also useful in cases where a specific amount of silver (I) reduction is desired because of the "tunable" reduction conditions where the reduction reaction can be quenched by cooling to room temperature to impede further reduction.

Methods disclosed herein eliminate the presence of extra ions, such as citrate ion, as byproducts associated with the use of an external reducing agent. These byproduct ions that can adsorb to the Ag-polymer composites and interfere with the attachment of specific ligands needed to detect/chelate an analyte of interest when the composite is used in sensing applications and/or other applications. Thus, the composites disclosed herein benefit from the absence of trace byproducts of external reducing agents that would typically be employed to reduce silver (I) to silver (0).

Figure 1:
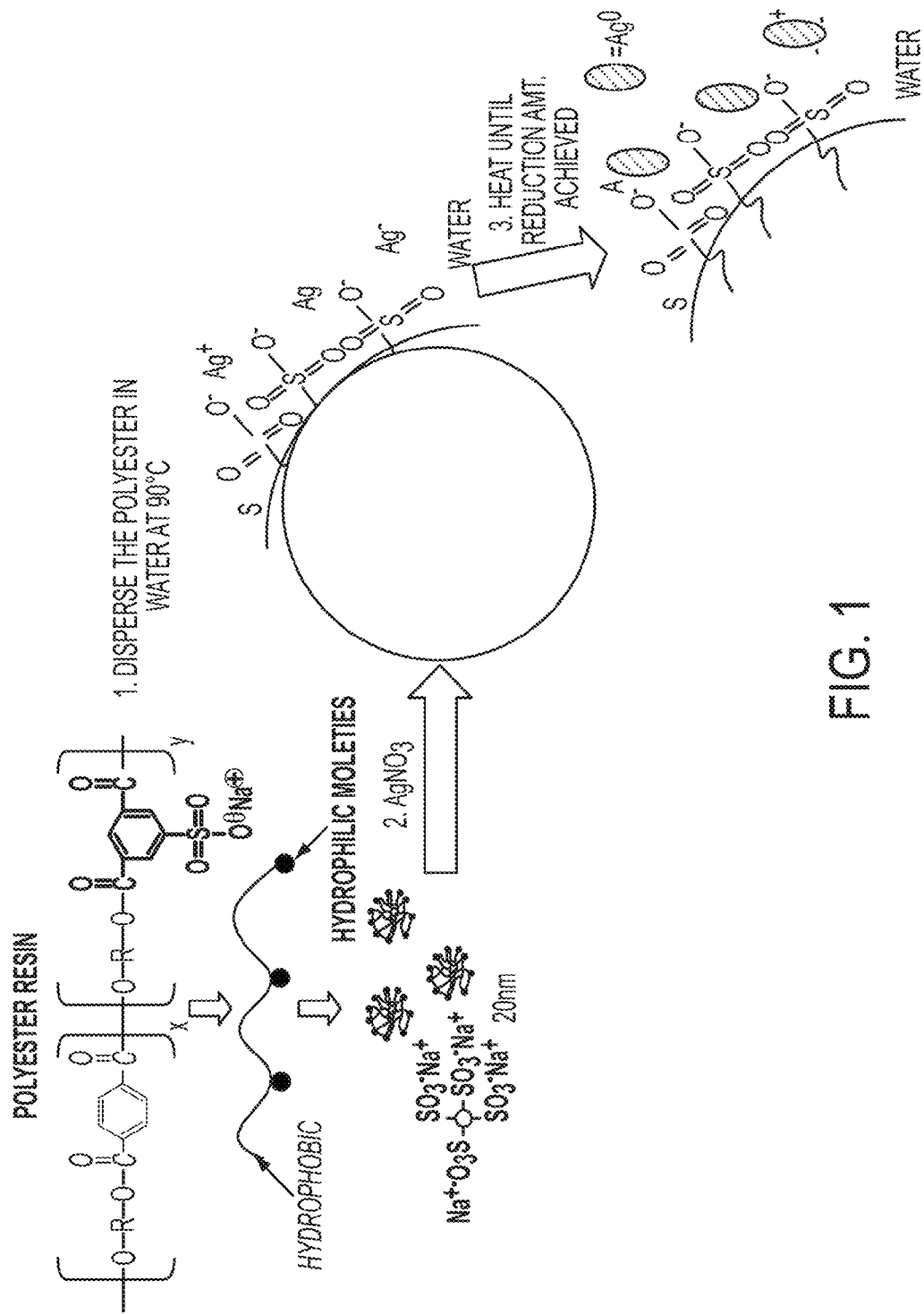
FIG. 1 shows a postulated mechanism of sulfonated polyester self-assembly in the presence of silver ion without use of an external reducing agent.

The sulfonated polyester resins disclosed herein possess a hydrophobic backbone and hydrophilic sulfonate groups attached to the chain. Without being bound by theory, it is postulated that when placed in water and heated, the hydrophobic portions interact with each other to form a hydrophobic core and the hydrophilic moieties (sulfonate groups) face the surrounding water as indicated in FIG. 1. Therefore, the sulfonated polyester self-assembles into a higher order, spherical nanoparticle without additional reagents, thus effecting self-assembly in water.

Embodiments provide methods of synthesizing AgNPs simultaneously during the self-assembly process without the use of a reducing agent. Silver ions are trapped within the polymer matrix during the self-assembly of the sulfonated polyesters while simultaneously being reduced to AgNPs. As disclosed herein, when more sulfonated polyester (SPE) was added to emulsion (i.e., higher solids content), the reduction of silver occurred faster. When higher loadings of silver nitrate are needed for reduction, the SPE provided excellent stability compared to AgNP/SPE nanocomposites synthesized with an external conventional reducing agent. Overall the amount of SPE:silver nitrate ratio can be tuned to control reduction time, reduction amount and overall stability of the Ag-polymer emulsion.

In embodiments, the reduction can be monitored over time by UV-VIS absorption spectroscopy because nanosized silver particles have a plasmon absorption peak around 400 nm. The broader the peak, the smaller the nanoparticles. The higher the λmax, the greater the amount of AgNPs reduced within the polymer matrix.

Without being bound by theory it has been postulated that the sulfonated polyester resin has numerous functions in the synthesis of the composites disclosed herein including: (1) potentially acting as in reducing capacity, as evidenced by increased reduction at higher polymer concentrations; (2) stabilizing the silver nanoparticles within the polymer matrix (capping agent), and (3) utilizing its own sulfonate groups as "self-stabilizers" in an aqueous medium.

At high solids content, such as about more than about 40% weight percent of the sulfonated polyester (SPE) solution, the solution becomes thick and may impair the ability of silver ions to associate with the polymer due to mobility interference with the polymer chains. However, this may be remedied by longer mixing times prior to heating to allow for more uniform dispersion of silver ion. However, the rate of reduction is not expected to be delayed by the presence of large amounts of the SPE matrix in solution. Regardless of the concentration, the matrix may play an important role in uniformly dispersing the silver nanoparticles in water. By contrast, composites made by mechanical mixing of prefabricated silver nanoparticles (AgNPs) with molten polymers usually lead to inhomogeneous particle dispersions. The AgNPs have high surface reactivity and are inclined to aggregate with each other into larger domains or clusters instead of dispersing within the polymer matrix.

In embodiments, there are provided methods comprising heating a sulfonated polyester resin in an organic-free solvent, adding a solution of silver (I) ion to the heated resin in water to form a mixture, and heating the mixture to effect the reduction of silver (I) ion to silver (0) in the absence of an external reducing agent. In embodiments, the organic-free solvent is water.

As used herein, the term "external reducing agent" refers to conventional reducing agents that might be added to a mixture of polymer and silver salt to effect an in situ reduction. Examples of external reducing agents include, without limitation, citrate salts, thiosulfate, hydride-based reagents such as sodium borohydride, free-reducing sugars, ascorbic acid, and the like. As disclosed herein, there is a correlation between concentration of sulfonated polyester (SPE) resin and effective reducing capacity at elevated temperatures in aqueous silver (I)/SPE systems suggesting that the sulfonated polyester matrix may serve a role as a reducing agent.

In embodiments, methods further comprise monitoring the reduction of silver (I) ion to silver (0). Monitoring may be accomplished by any detection means. As shown in the Examples below, an easy detection method may include UV-Vis absorption monitoring based on the plasmon absorption peak around 400 nm. Other methods that may be used to monitor the progress of reduction include, scanning electron microscopy (SEM), transmission electron microscopy (TEM) and energy dispersive x-ray spectroscopy (EDS or EDX).

In embodiments, methods further comprise cooling the mixture when a target silver (0) concentration is obtained. In embodiments, cooling from ambient temperature to below about 65° C. can sufficiently slow or stop reduction. In embodiments, cooling is effected by simply removing the heating source. As indicated in the Examples below, reduction can be carried out at elevated temperatures and the progress monitored. In embodiments, the reduction is carried out initially at an elevated temperature of from about 65° C. to about 95° C., with a particularly good target temperature of about 90° C. In embodiments, the temperature is from about 80° C. to 90° C. In a particular embodiment, the initial elevated temperature is from about 88° C. to about 92° C. The reduction can be quenched by reducing the temperature of the mixture, thus allowing targeting of the silver (0) concentration. In embodiments, the quenching is performed by reducing the temperature from about 95° C. to about 30° C., or from about 90° C. to about 21° C. In a particular embodiment, the temperature is reduced ambient temperature. In embodiments, the target silver (0) concentration is in a range from about 100 to about 10,000 ppm. Concentrations of silver (0) in the range of about 5 ppm-1,000 ppm are suitable for antimicrobial and catalysis applications. Antimicrobial concentrations may range from about 5 ppm to about 1,000 ppm or from about 20 ppm to about 500 ppm, or from about 30 ppm to about 100 ppm. Concentrations of 100 ppm-100,000 ppm are suitable for enhancing the thermal properties of a material, such as thermal conductivity. Thermal enhancement and other physical properties (tensile strength) may be realized from about 100 ppm to about 100,000 ppm, or from about 500 ppm to about 50,000 ppm, or from about 1,000 ppm to about 10,000 ppm. Concentrations of 10,000 ppm have been reported to improve the mechanical properties of polymer-silver composites, such as elongation at break, maximum tensile strength and Young modulus.

In embodiments, methods further comprise adding a second portion of sulfonated polyester resin while heating the mixture. In such embodiments, an initial incubation with SPE and silver (I) ion may serve to establish an equilibrium association between silver (I) ion and the SPE polymer matrix. The second portion of sulfonated polyester resin may be added before, during, or after heating. The second portion may be provided as a non-external reducing agent source.

Figure 6A:
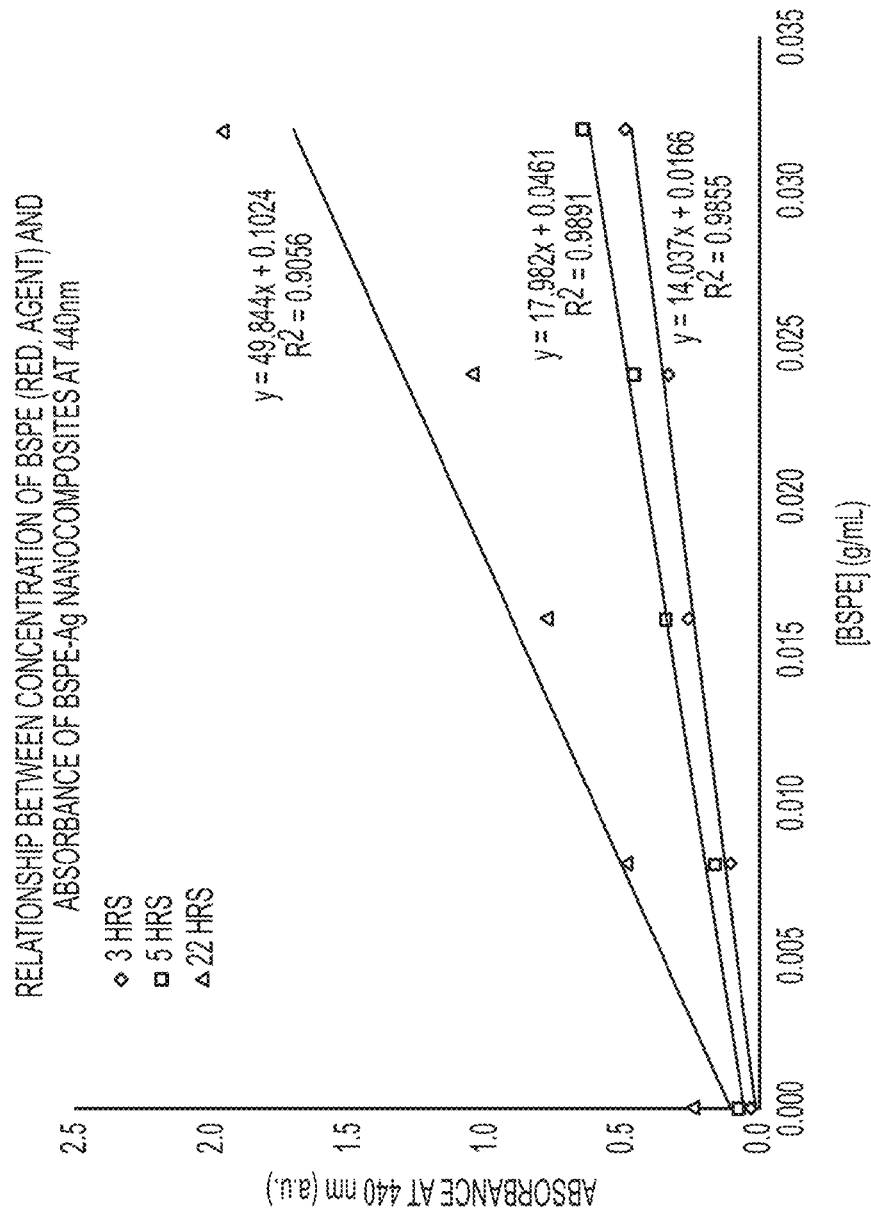
FIG. 6A shows a plot of UV-Vis absorption as a function of concentration of BSPE and absorbance of BSPE-Ag nanocomposites at 440 nm for each time interval.
Figure 6B:
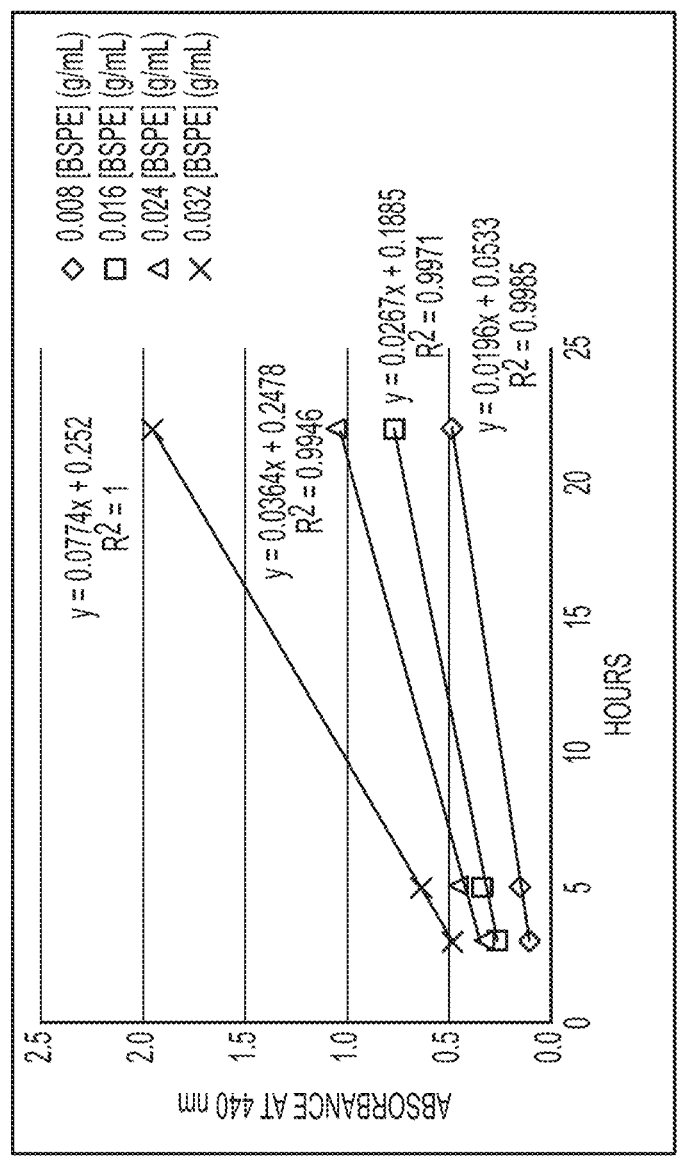
FIG. 6B shows a plot of UV-Vis absorption as a function of time at various concentrations of BSPE at 440 nm.

In embodiments, an amount of the sulfonated polyester resin to silver (I) ion may be in a range from about 1:100 to about 1:1, or from about 1:25 to about 1:3. In embodiments, the ratio is a function of the extent of reduction which can be tuned via reduction time at the elevated temperature. Thus, a standard plot of absorbance as a function of time for a given concentration of polymer matrix at fixed temperature will allow a determination of the time needed for a given absorbance. Silver absorbance at 440 nm serves as a measure of the extent of reduction. FIG. 6B provides an example of such a plot. Complete reduction may be measured by surface-enhanced Raman spectroscopy (SERS).

The stability of the resultant composites can be evaluated via measurement of the zeta potential. As a point of reference, an exemplary stock solution with 25.5% polymer solids from Example 1 below has a high stability of about −60 mV, as indicated in the table below. Sample 5 in the Examples below was stable after 14 days of aging at ambient temperature (sample shown in FIG. 10B).

In embodiments, heating is conducted at a temperature from about 65° C. to about 90° C. The exact temperature selected may be a function of how fast the desired reduction is to be effected. It may be desirable to run reduction at lower temperatures where small loadings of nanoparticles are desirable. It was observed experimentally that reduction commences measurably at about 60° C.; higher temperatures will generally be beneficial for timely reduction.

In embodiments, a source of silver (I) ion is selected from the group consisting of silver nitrate, silver sulfonate, silver fluoride, silver perchlorate, silver lactate, silver tetrafluoroborate, silver oxide, and silver acetate.

In embodiments, the silver nanoparticles may comprise solely elemental silver or may be a silver composite, including composites with other metals. Such metal-silver composite may include either or both of (i) one or more other metals and (ii) one or more non-metals. Suitable other metals include for example Al, Au, Pt, Pd, Cu, Co, Cr, In, and Ni, particularly the transition metals for example Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include for example Si, C, and Ge. The various components of the silver composite may be present in an amount ranging for example from about 0.01% to about 99.9% by weight, particularly from about 10% to about 90% by weight. In embodiments, the silver composite is a metal alloy composed of silver and one, two or more other metals, with silver comprising for example at least about 20% of the nanoparticles by weight, particularly greater than about 50% of the nanoparticles by weight. Unless otherwise noted, the weight percentages recited herein for the components of the silver-containing nanoparticles do not include the stabilizer.

Silver nanoparticles composed of a silver composite can be made for example by using a mixture of (i) a silver compound (or compounds, especially silver (I) ion-containing compounds) and (ii) another metal salt (or salts) or another non-metal (or non-metals) during the reduction step.

Those skilled in the art will appreciate that metals other than silver may be useful and can be prepared in accordance with the methods disclosed herein. Thus, for example, composites may be prepared with nanoparticles of copper, gold, palladium, or composites of such exemplary metals.

In embodiments, the sulfonated polyester resin is a branched polymer. In embodiments, the sulfonated polyester resin is a linear polymer. In embodiments, the sulfonated polyester resin is a sodium, lithium, or potassium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate). In embodiments, the counteraction to the sulfonate group can be any non-participatory cation, as known to those skilled in the art, and may include without limitation, sodium, potassium, lithium, and the like.

In embodiments, wherein the sulfonated polyester resin comprises a polyol monomer unit selected from the group consisting of trimethylolpropane, 1,2-propanediol, diethylene glycol, and combinations thereof. In embodiments, wherein the sulfonated polyester resin comprises a diacid monomer unit selected from the group consisting of terephthalic acid, sulfonated isophthalic acid, and combinations thereof.

In embodiments, there are provided composites comprising a sulfonated polyester matrix and a plurality of silver nanoparticles dispersed within the matrix, wherein the composite lacks trace residual byproducts from external reducing agents.

Significant differences in stability via zeta potential measurements can be observed when reduction is performed with or without a reducing agent. These differences in zeta potential are independent of thermal ($T_g$) or molecular weight properties. Comparing two dispersions of equal solids and Ag content, the dispersion with no reducing agent is substantially more stable and this is believed to be due to the reducing agent causing some charge differential and slight aggregation. As an example, a sample lacking a reducing agent had a zeta potential of −80.7 mV versus a sample prepared with trisodium citrate which had a zeta potential of −56.0 mV.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

General Process: A method for preparing emulsion compositions containing silver nanoparticles silver (I) salts, reducing agents and sulfonated polyester resins where an emulsion latex comprised of sulfonated polyester resin particles are produced comprises (i) heating resin in water at a temperature from about 65° C. to 90° C. and (ii) adding an aqueous solution of silver nitrate drop-wise to emulsion. This will result in AgNP-BSPE composite particles that can range anywhere from about 5 to about 500 nanometers in diameter depending on process conditions such as sulfonated polyester solids loadings, amount of silver, rpm, temperature, etc.

In particular embodiments, a composite preparation may be prepared by dispersing a branched sulfonated polyester (BSPE) in water at about 90° C., followed by addition of a silver nitrate solution and lastly heating to effect the reduction of Ag(I) to Ag(0).

Example 1

This example describes the preparation of a branched sodio sulfonated amorphous polyesters (BSPE-1).

A branched amorphous sulfonated polyester resin comprised of 0.425 mole equivalent of terephthalate, 0.080 mole equivalent of sodium 5-sulfoisophthalic acid, 0.4501 mole equivalent of 1,2-propanediol, and 0.050 mole equivalent of diethylene glycol, was prepared as follows. In a one-liter Parr reactor equipped with a heated bottom drain valve, high viscosity double turbine agitator, and distillation receiver with a cold water condenser was charged 388 grams of dimethylterephthalate, 104.6 grams of sodium 5-sulfoisophthalic acid, 322.6 grams of 1,2-propanediol (1 mole excess of glycols), 48.98 grams of diethylene glycol, (1 mole excess of glycols), trimethylolpropane (5 grams) and 0.8 grams of butyltin hydroxide oxide as the catalyst. The reactor was heated to 165° C. with stirring for 3 hours and then again heated to 190° C. over a one hour period, after which the pressure was slowly reduced from atmospheric pressure to about 260 Torr over a one hour period, and then reduced to 5 Torr over a two hour period. The pressure was then further reduced to about 1 Torr over a 30 minute period and the polymer was discharged through the bottom drain onto a container cooled with dry ice to yield 460 grams of sulfonated-polyester resin. The branched sulfonated-polyester resin had a glass transition temperature measured to be 54.5° C. (onset) and a softening point of 154° C.

Example 2

BSPE-1 Stock Solution for Dilution

A stock solution of BSPE-1 in water was made by adding 0.5 g BSPE-1 to 125 mL distilled water. The stock solution had a [BSPE-1]=0.004 g/mL. Six 10 mL glass vials were rinsed three times with distilled water, three times with acetone and allowed to air dry. Various volumes of water and stock BSPE solutions were added to the vials as outlined in Table 1 below. The vials were equipped with a magnetic stir bar and capped with aluminum foil. The vials were heated to 90° C. and stirred at 950 rpm. After 1 hour, 1.884 mL of 0.1 M $AgNO_3$ solution was added to each vial with a micropipette. To vial 6, 2.116 mL of 1% trisodium citrate dihydrate reducing agent was added with a micropipette. The solutions were mixed for 22 hours at 90° C. at 950 rpm. UV-Vis measurements were done 3 hours after the addition of $AgNO_3$, 5 hours and 22 hours. The reduction of silver was apparent by the colour change to yellow/brown.

| Sample | Vol. total (mL) | Vol. of Stock 0.004 g/mL BSPE (mL) | [BSPE] in vial (g/mL) | AgNO3 in vial (g) | Vol. 0.1M AgNO3 (mL) | Vol. DIW (mL) | Vol. Red agent (mL) |
|---|---|---|---|---|---|---|---|
| 1 | 10 | 0 | 0 | 0.032 | 1.884 | 8.116 | 0 |
| 2 | 10 | 2 | 0.008 | 0.032 | 1.884 | 6.116 | 0 |
| 3 | 10 | 4 | 0.016 | 0.032 | 1.884 | 4.116 | 0 |
| 4 | 10 | 6 | 0.024 | 0.032 | 1.884 | 2.116 | 0 |
| 5 | 10 | 8 | 0.032 | 0.032 | 1.884 | 0.116 | 0 |
| 6 | 10 | 6 | 0.024 | 0.032 | 1.884 | 0.000 | 2.116 |

Figure 2:
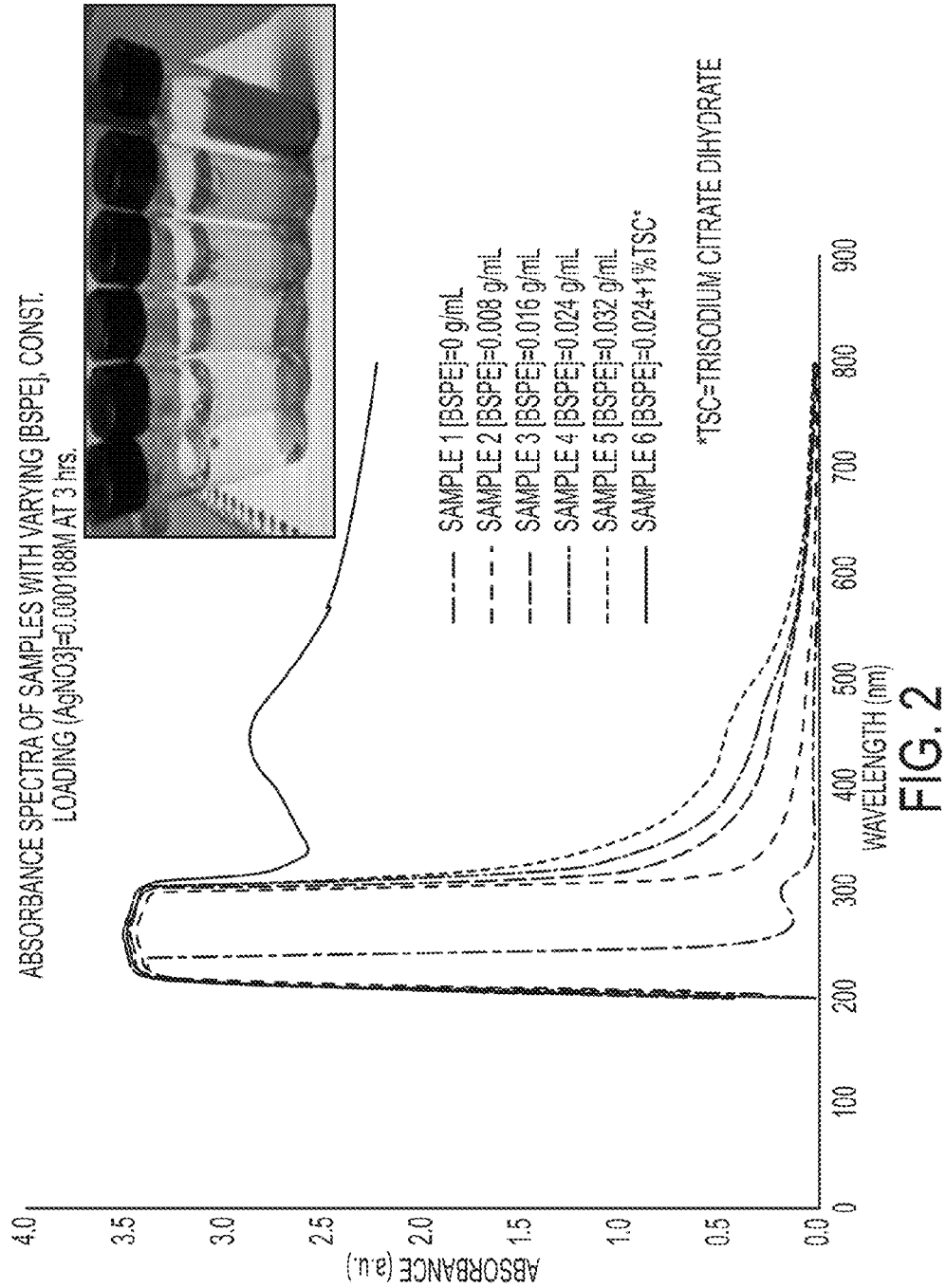
FIG. 2 shows overlaid ultraviolet-visible (UV-Vis) absorption spectra of Samples 1-6 with varying concentration of a branched sulfonated polyester (BSPE) and a constant loading of silver nitrate ($AgNO_3$) after 3 hours of heating.
Figure 3:
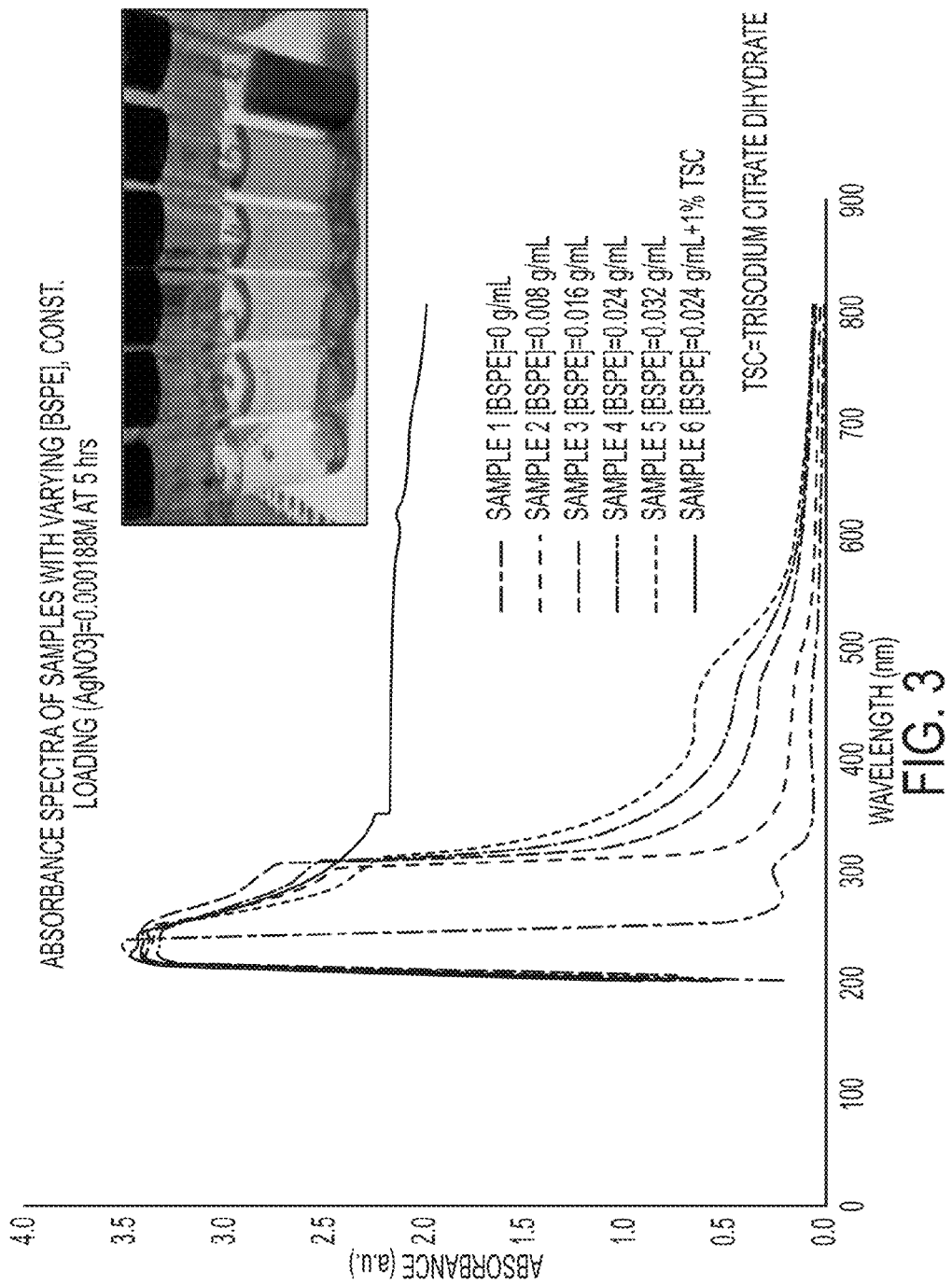
FIG. 3 shows overlaid UV-Vis absorption spectra of Samples 1-6 of FIG. 2 after 5 hours of heating.
Figure 4:
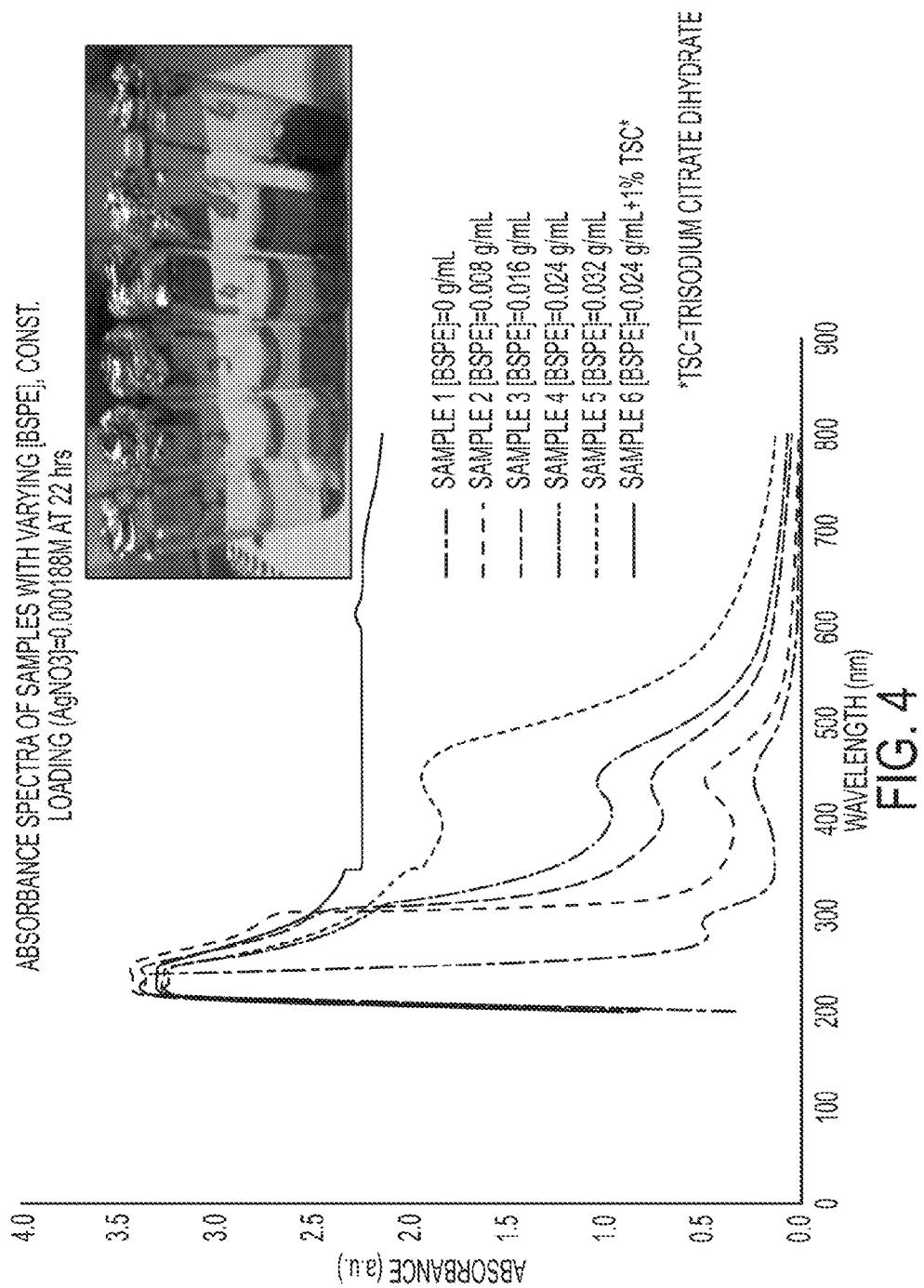
FIG. 4 shows overlaid UV-Vis absorption spectra of Samples 1-6 of FIG. 2 after 22 hours of heating.

AgNPs display surface plasmon resonance (SPR) upon irradiation with light resulting in SPR peaks in the UV-VIS wavelength range. The SPR phenomenon is a result of the interactions between the incident light and the free electrons in the conduction band of the AgNPs. Luoma, S. N. 2008. Project on Emerging Nanotechnologies, The Pew Charitable Trusts; Tolaymat, T., et al. Sci. Tot. Environ., (408)5:999-1006 (2010). FIGS. 2-4 show the UV-Vis absorption spectra of the six AgNP-BSPE dispersions prepared as given in Table 1 shown above. Significant increases in λmax are seen when the amount of BSPE is increased relative to $Ag^+$. As the heating time progressed, the λmax peak for each sample increased dramatically as indicated in FIG. 4. Although some evaporation was observed after 22 hours, the overall trend of increased silver reduction is clear. In FIG. 4, it can be seen that after 22 hours, the control sample with no BSPE (Sample 1) showed a slightly yellow colour and peak at 440 nm. This can be explained by the thermal decomposition of aqueous $AgNO_3$, given by the following equation: $2AgNO_3 \rightarrow 2Ag(s)+2NO_2(g)+O_2(g)$ $\Delta H°$ 298.15=314.97 kJ. The equilibrium constant ($K_c$) for this reaction is 2.13×10−30 and 1.98×10−6 at 295.15K and 400K, respectively. Stern, K. H. 1972. High temperature properties and decomposition of inorganic salts. Part 3 Nitrates and Nitrites. J. Phys. Chem. Ref. Data, (1) 3:767 At the temperature used in this experiment (363 K), the equilibrium constant should lie between these values. This relatively low magnitude of the equilibrium constant indicates that this is a minor interference thereby contributing an insignificant amount of discolouration to Vial 1.

FIGS. 2-4 show UV-Vis absorption spectra of samples with varying concentration of BSPE and a constant loading of $AgNO_3$. FIG. 2 shows spectra after 3 hours of heating, FIG. 3 shows spectra after 5 hours of heating and FIG. 4 shows spectra after 22 hours of heating. FIG. 5 shows the reduction of $Ag^+$ over time in the vial containing the most BSPE (vial 5) as the reducing agent. FIG. 6 shows the relationship between concentration of BSPE and absorbance of BSPE-Ag nanocomposites at 440 nm for each time interval. It is evident that as BSPE concentration increases so does the amount of reduced silver measured at 440 nm. The relationship of absorbance and BSPE concentration at each time measurement is highly correlated as seen by the r-squared for each trend line.

Figure 7:
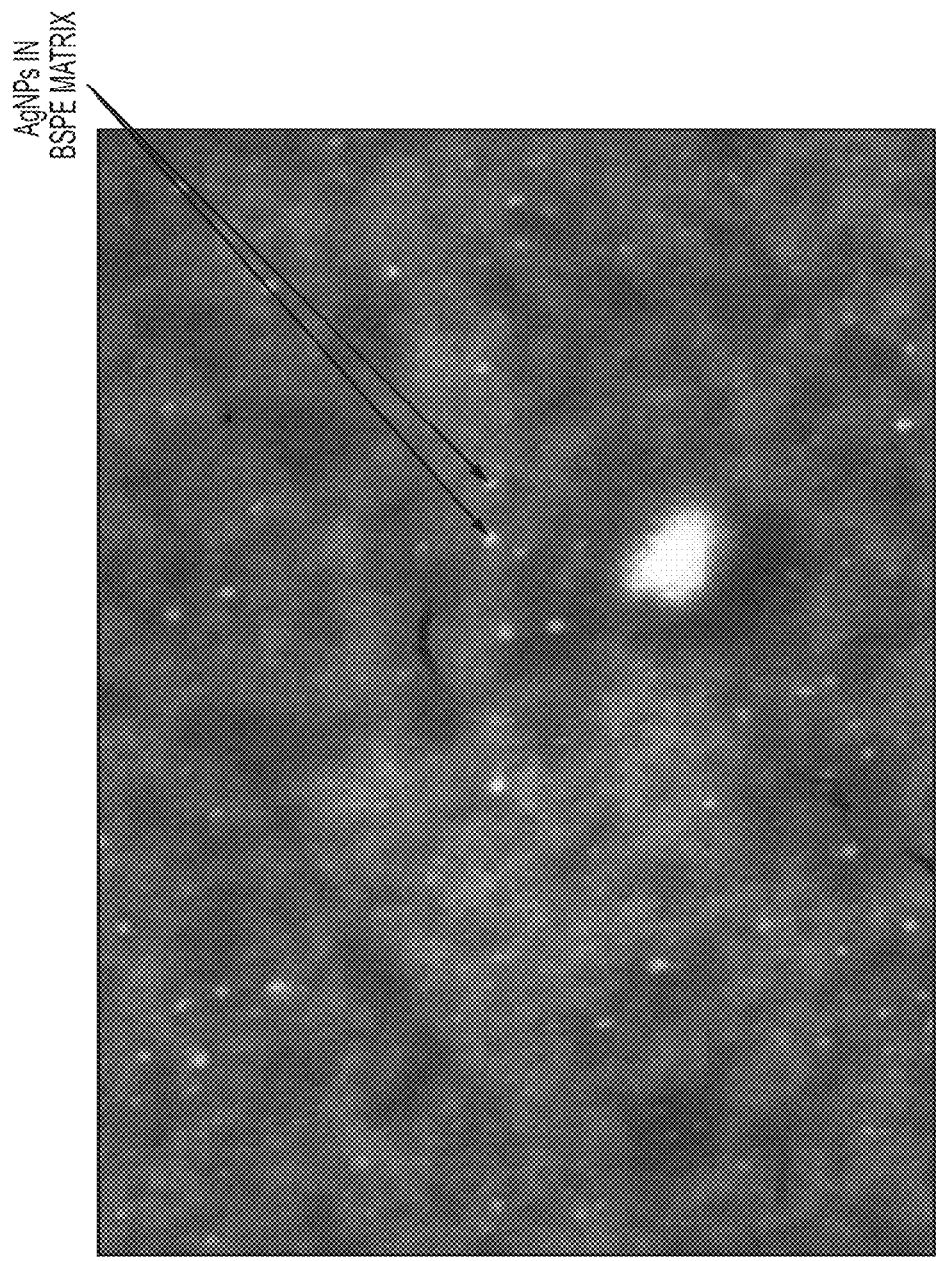
FIG. 7 shows a scanning electron microscope (SEM) image of reduced silver present in the exemplary BSPE matrix prepared in accordance with embodiments herein.
Figure 8:
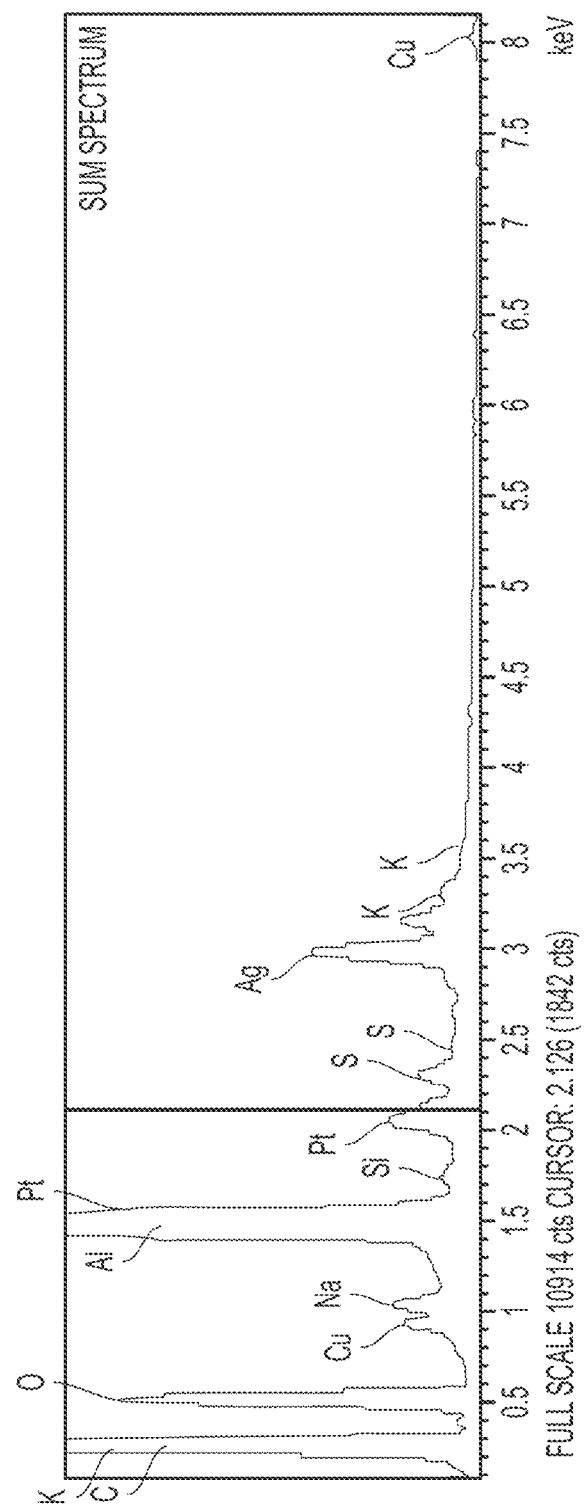
FIG. 8 shows the Energy Dispersive X-ray Spectroscopy (EDS) spectrum which displays the elemental distribution in a sample surface at a depth of about 1 to about 2 microns; the aluminum peak is from the background film that the sample was plated on; the platinum peak is from the coating of the sample during SEM analysis.

FIG. 7 shows SEM of reduced Ag in BSPE matrix and FIG. 8 shows the Energy Dispersive X-ray Spectroscopy or EDS which displays the elemental distribution in a sample surface at a depth of 1-2 microns. The aluminum peak is from the background film that the sample was plated on; the platinum peak is from the coating of the sample during SEM analysis.

The reduction of $Ag^+$ using BSPE can be controlled by temperature changes. The reduction of $Ag^+$ occurs readily at 90° C., however does not occur at room temperature (22° C.). This is shown in FIG. 9A/B.

Figure 9B:
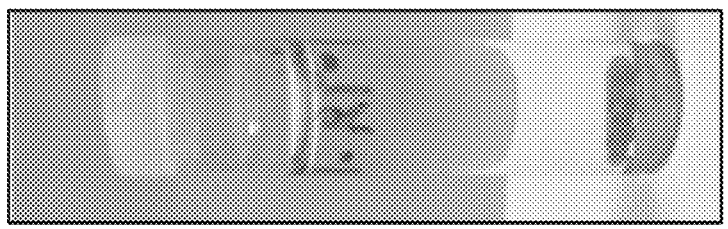
FIG. 9B shows a control Sample with no BSPE and constant loading $AgNO_3$ concentration of 0.32% (w/w) after 22 hours.
Figure 9A:
FIG. 9A shows Samples 1-5 of increasing BSPE concentration from left to right and constant loading $AgNO_3$ concentration of 0.32% (w/w) after 22 hours.

FIG. 9A Samples of increasing [BSPE] from left to right and constant loading [$AgNO_3$] of 0.32% (w/w) after 22 hours. FIG. 9B Sample with no BSPE and constant loading [$AgNO_3$] of 0.32% (w/w) after 22 hours.

Figure 10A:
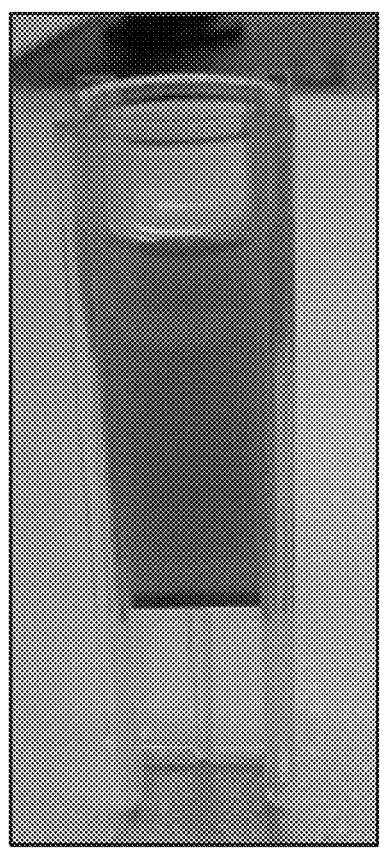
FIG. 10A shows a black precipitate observed when taking UV-Vis measurement of Sample 6 at 5 hours; Sample 6 contains BSPE at a concentration of about 0.024 g/mL and 1% Trisodium citrate dihydrate as an external reducing agent.
Figure 10B:
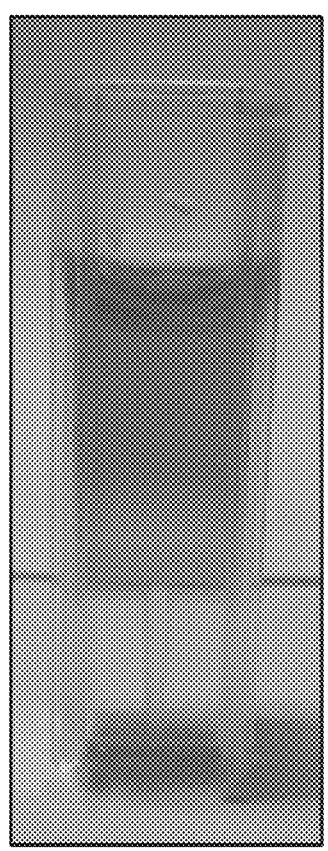
FIG. 10B shows Sample 5 after 14 days; it contains only BSPE at a concentration of 0.032 g/mL and no external reducing agent.

If the addition of a strong reducing agent (in this Example trisodium citrate dihydrate) is rapid in the presence of silver, the silver can reduce quickly, agglomerate and become destabilized. This can be seen by the brown/black precipitate observed when taking the UV-Vis measurement of Sample 6 after 5 hours (FIG. 10A). FIG. 10A Black precipitate observed when taking UV-Vis measurement of vial 6 at 5 hours. Vial 6 contains BSPE at a concentration of 0.024 g/mL and 1% trisodium citrate dihydrate (reducing agent). FIG. 10B Sample 5 after 14 days, contains only BSPE at a concentration of 0.032 g/mL.

Figure 11:
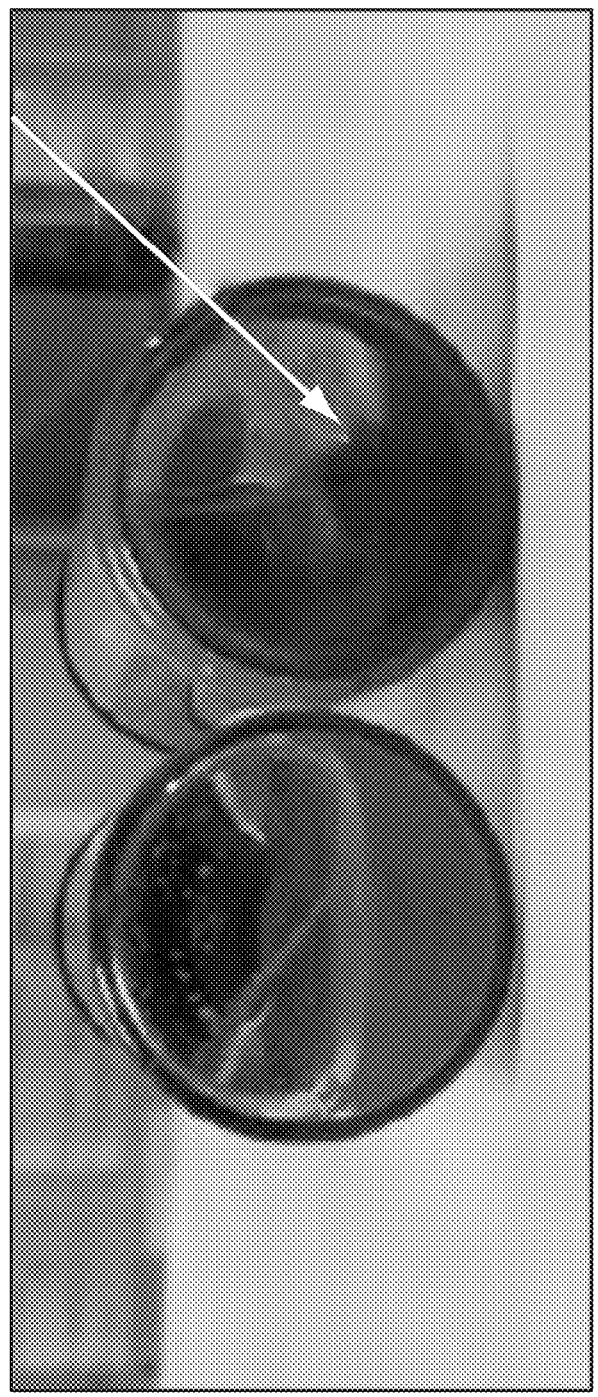
FIG. 11 shows Samples 5 (left) and 6 (right) after 14 days; Sample 5 is still stable (no precipitate) while Sample 6 (with external reducing agent) has a significant amount of black precipitate.

FIG. 11 shows 14 days after the completion of the experiment, vial 5 is still stable (no precipitate) however vial 6 has a significant amount of black precipitate.

What is claimed is:

1. A method comprising:
heating a sulfonated polyester resin in an organic-free solvent;
adding an aqueous solution of silver (I) ion to the heated resin to form a mixture; and
heating the mixture to effect the reduction of silver (I) ion to silver (0) in the absence of a further reducing agent.

2. The method of claim 1, further comprising monitoring the reduction of silver (I) ion to silver (0).

3. The method of claim 2, further comprising cooling the mixture when a target silver (0) concentration is obtained.

4. The method of claim 3, where the target silver (0) concentration is in a range from about 5 to about 500,000 ppm.

5. The method of claim 1, further comprising adding a second portion of sulfonated polyester resin while heating the mixture.

6. The method of claim 1, wherein a ratio of the sulfonated polyester resin to silver (I) ion is in a range from about 1:100 to about 1:1.

7. The method of claim 1, wherein heating is conducted at a temperature from about 65° C. to about 90° C.

8. The method of claim 1, wherein the organic-free solvent is water.

9. The method of claim 1, wherein a source of silver (I) ion is selected from silver nitrate, silver sulfonate, silver fluoride, silver perchlorate, silver lactate, silver tetrafluoroborate, silver oxide, silver acetate.

10. The method of claim 1, wherein the sulfonated polyester resin is a branched polymer.

11. The method of claim 1, wherein the sulfonated polyester resin is a linear polymer.

12. The method of claim 1, wherein the sulfonated polyester resin is a sodium, lithium, or potassium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

13. The method of claim 1, wherein the sulfonated polyester resin comprises a polyol monomer unit selected from the group consisting of trimethylolpropane, 1,2-propanediol, diethylene glycol, and combinations thereof.

14. The method of claim 1, wherein the sulfonated polyester resin comprises a diacid monomer unit selected from the group consisting of terephthalic acid, sulfonated isophthalic acid, and combinations thereof.

* * * * *